United States Patent [19]

Holz et al.

[11] Patent Number: 4,465,591
[45] Date of Patent: Aug. 14, 1984

[54] METHOD AND APPARATUS FOR TREATING WASTE PAPER

[75] Inventors: Emil Holz, Eningen; Hagen Hutzler, Reutlingen, both of Fed. Rep. of Germany

[73] Assignee: Hermann Finckh Maschinenfabrik GmbH & Co., Pfullingen, Fed. Rep. of Germany

[21] Appl. No.: 398,773

[22] Filed: Jul. 16, 1982

Related U.S. Application Data

[63] Continuation of Ser. No. 194,823, Oct. 7, 1980, abandoned.

[30] Foreign Application Priority Data

Oct. 17, 1979 [DE] Fed. Rep. of Germany ....... 2941898

[51] Int. Cl.³ .......................... D21D 5/04; B07B 1/04; B03B 7/00
[52] U.S. Cl. ........................................ 209/3; 209/239; 162/4
[58] Field of Search .......................... 162/4, 5, 55, 261; 209/3, 239; 241/60, 61, 79.2

[56] References Cited

U.S. PATENT DOCUMENTS

| 3,330,487 | 7/1967 | Pav | 241/5 |
| 3,387,794 | 6/1968 | Bidwell | 241/21 |
| 3,994,770 | 11/1976 | Lausch | 162/55 |
| 4,194,968 | 3/1980 | Pfalzer | 162/4 |
| 4,231,526 | 11/1980 | Ortner et al. | 162/4 |

FOREIGN PATENT DOCUMENTS

| 1461039 | 3/1969 | Fed. Rep. of Germany . |
| 209648 | 1/1924 | United Kingdom . |
| 393824 | 6/1933 | United Kingdom . |
| 642481 | 9/1950 | United Kingdom . |
| 940250 | 10/1963 | United Kingdom . |
| 1432650 | 4/1976 | United Kingdom . |
| A2009278 | 6/1979 | United Kingdom . |

OTHER PUBLICATIONS

Tappi, vol. 61, No. 8, pp. 73-75, 8/78.

Primary Examiner—William F. Smith
Attorney, Agent, or Firm—Leydig, Voit, Osann, Mayer & Holt, Ltd.

[57] ABSTRACT

The invention relates to a method of treating waste paper, wherein the waste paper is steeped, under certain circumstances chemically treated at the same time, and is thereafter adjusted to a lower substance density and sorted. Furthermore the invention relates to apparatus for performing such a method.

9 Claims, 5 Drawing Figures

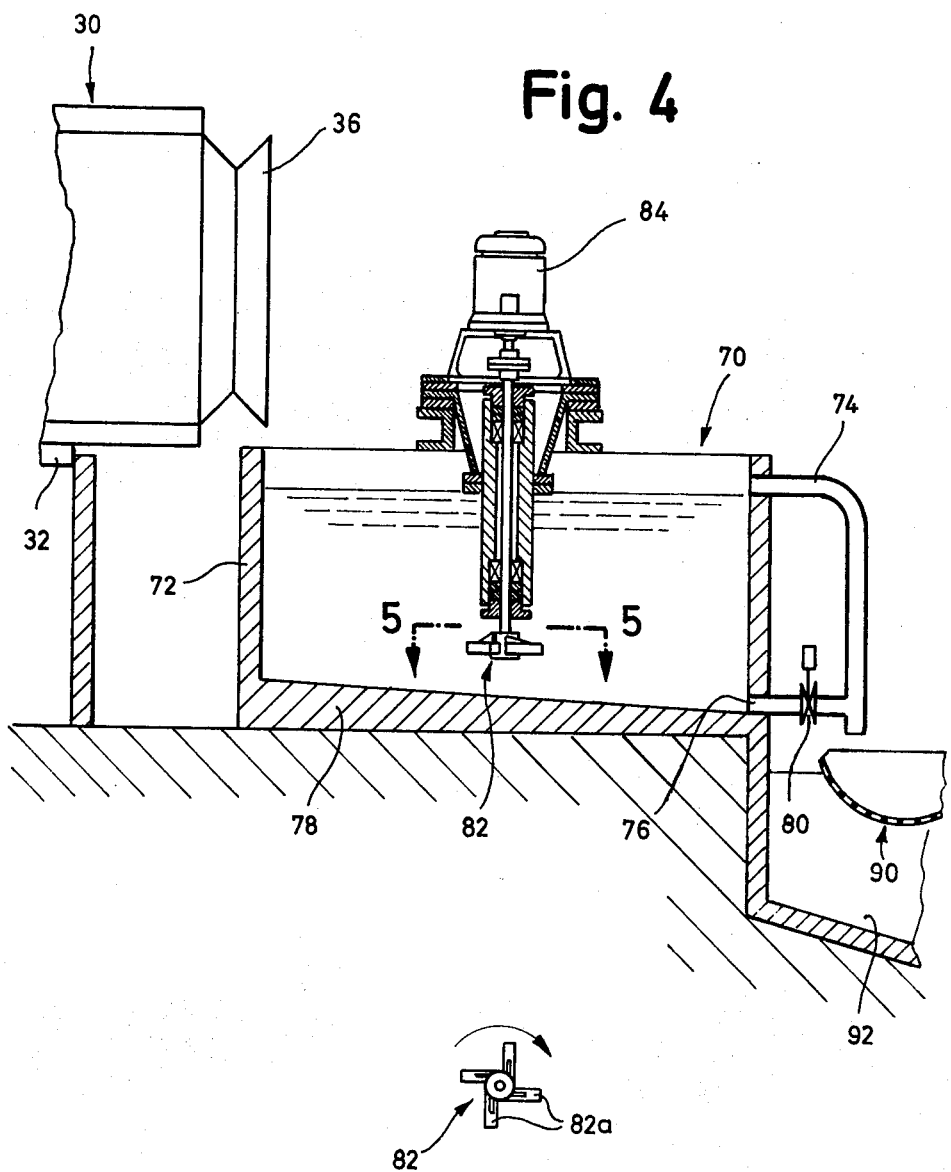

METHOD AND APPARATUS FOR TREATING WASTE PAPER

This is a continuaton of application Ser. No. 194,823, filed Oct. 7, 1980, abandoned.

DESCRIPTION

In the methods of treating waste paper which are usual in the art, the procedure is such that the same together with water is introduced into a so-called substance loosener (also referred to as pulper) which comprises an upwardly open container the bottom of which is penetrated by the driving shaft of a pulper wheel arranged in the interior of the container; above the container bottom and below the pulper wheel there is located a screen, and the container bottom is provided with an outlet. In these known pulpers so much water is added to the waste paper that they operate in a substance density range of approximately from two to six percent. The pulper is operated until the waste paper is dissolved to the largest possible extent, and the screen above the container bottom serves for retaining non-dissolvable material, such as metal parts, wood and synthetic resin parts (as far as this is possible) - during the dissolution of the waste paper in the pulper the pulper wheel unavoidably comminutes also synthetic resin components such as synthetic resin coatings of paper and cardboard, synthetic resin sacks and bags, and so forth, so that a considerable proportion of the synthetic resin can pass through the screen of the pulper and later on can be separated only with difficulty from the fibre suspension produced in the pulper. Further disadvantages of the known method are high wear of the pulper wheel and the screen, caused above all by the metal parts contained in the waste paper and the necessary long operating time of the pulper until dissolution of the waste paper, stand-still periods because of the cleaning necessary at intervals of the screen located above the container bottom, and the high energy demand for the dissolution of the waste paper in the pulper.

Altogether not better is the employment which has recently become known of a conventional pulper having a screen with larger openings in conjunction with a so-called after-pulper of the same construction the screen of which, however, comprises considerably smaller openings. In this method a portion of the dissolution work is performed by the after-pulper, and particles of wood and metal as well as other light dirt, such as e.g. foamed synthetic resins, are separated out from the fibre suspension in the after-pulper. Admittedly, because of the larger openings of its screen the first pulper need not be cleaned so frequently, i.e. the cleaning intervals thereof are longer, but in this known method dirt particles, and above all synthetic resins, are comminuted to such extent that later sorting out thereof causes disproportionally high further costs and leads to considerable deterioration of the qualitiy of the fibre material produced. Moreover, obviously likewise relatively much energy is required for this kind of treatment.

The invention was thus based on the object to provide a method of treating waste paper in which the latter is dissolved in a more careful manner, and, moreover, less energy is required, and by which the disadvantages referred to above of the known methods may be avoided at least partly.

Starting from a method of the kind referred to above this problem may be solved according to the invention in that the steeping time amounts to approximately from 10 to 120 minutes and at the same time a substance density of approximately from ten to fourty percent is adjusted, that for the purpose of adjusting a substance density of between more than two percent and approximately six percent diluting water is added to the steeped fibre material and fibre material and diluting water are set to rapid circulation for the purpose of mixing, whereupon the fibre suspension is sorted without pressure. The method according to the invention is based on the recognition that with sufficient steeping time and application of a powerful mixing process the waste paper is dissolved in a satisfactory manner, so that a pulper with all its disadvantages can be omitted.

In a preferred constructional form of the method according to the invention the waste paper to be steeped is weighed and the quantity of water to be added thereto is computed and dimensioned in accordance with a predetermined substance density, so that the substance density which is most favourable for the steeping and the dissolution may be obtained with certainty.

For performing the method according to the invention apparatus has found to be particularly favourable which comprises a distributor device for dividing the waste paper to be steeped and distributing it to a conveyor device which latter is followed by a rotating, lying steeping drum open at both ends, and which furthermore comprises a mixer which is arranged behind the outlet opening of the steeping drum and which comprises an upwardly open container as well as a drivable mixer wheel which is arranged above the bottom of the container, wherein advantageously the mixer wheel is arranged directly above the bottom of the container. By means of such apparatus the method according to the invention may be performed continuously, for which reason it is recommended to provide the mixing container with an overflow for a continuous discharge of the fibre suspension.

Further advantages, features and details of the invention become clear from the accompanying claims and/or from the following description and the accompanying illustrative representation of a preferred constructional form of the apparatus according to the invention.

In the enclosed drawings the following is shown:

FIG. 4 shows the mixer of the apparatus according to FIG. 1 in a larger scale, and FIG. 5 shows the rotor of this mixer in a top view according to line 5—5 in FIG. 4.

Figure 1:
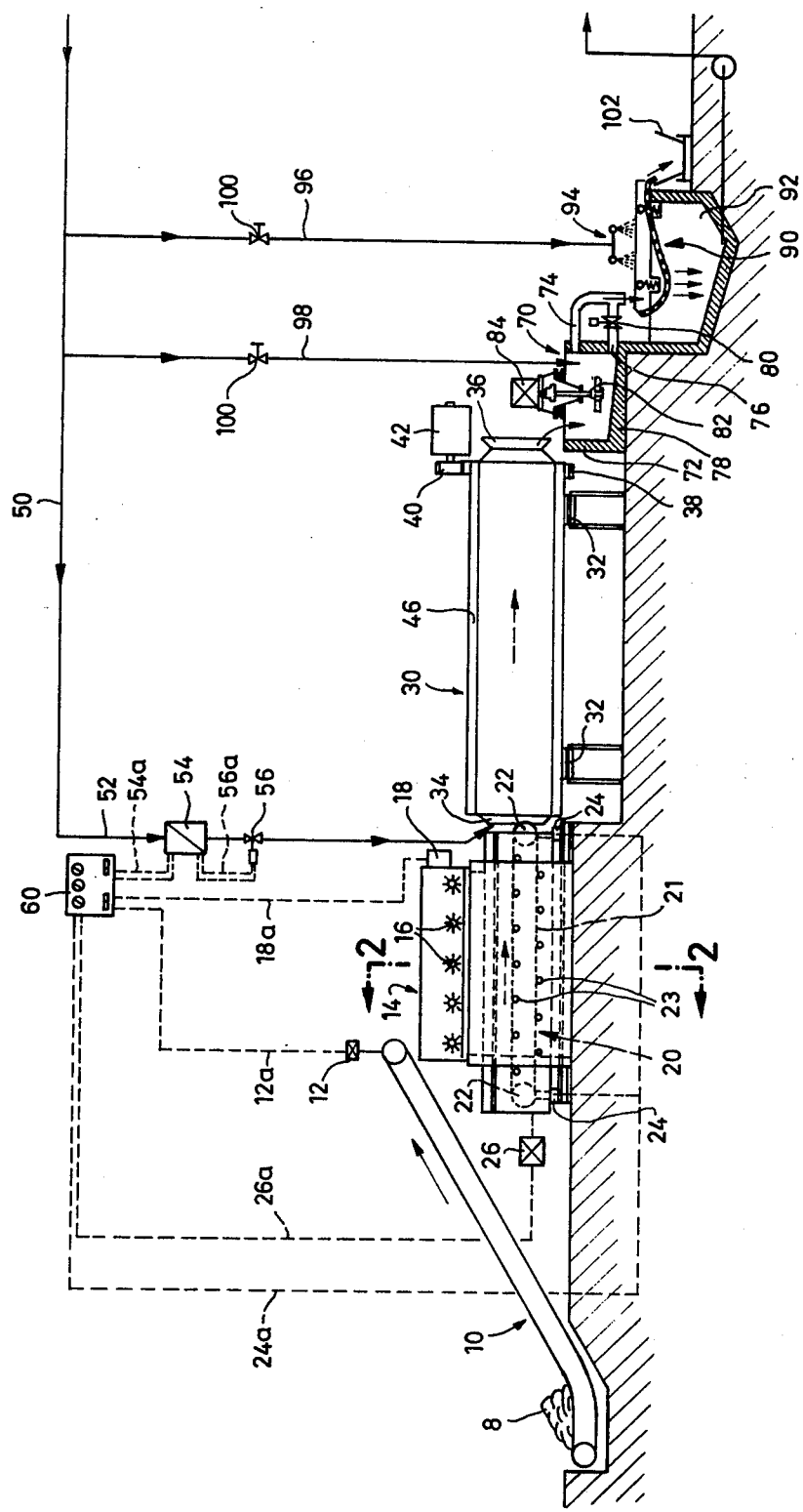
FIG. 1 shows a schematic overall view of the inventive apparatus.

In the performance of a preferred embodiment of the method according to the invention, the waste paper 8 which may be loose or in bales is loaded upon a conveyor belt 10, e.g. by means of a fork loader not illustrated, the conveyor belt 10 having a driving device 12. The waste paper falls off this conveyor belt from above into a duct of a paper distributor device 14 in the upper region of which a plurality of distributor shafts 16 are rotatably mounted which extend transversely over the duct and which are fitted with teeth or rakes described later on. These distributor shafts 16 are driven by a common motor 18 and by means of a chain in such a manner that they divide the waste paper introduced from above into the paper distributor device and cause it to drop in uniform distribution upon a conveyor belt device 20 arranged below the downwardly open paper distributor device 14 and by which the waste paper loaded into the conveyor belt device can be weighed. The conveyor belt 21 travels over two rollers 22 one of which is driven by a driver motor 26. The conveyor belt device 20 is supported by well known weighing elements 24 producing an electric output signal proportional to the weight of the waste paper spread over the conveyor belt 21. The construction is so designed that the weighing elements 24 permit the quantity of waste paper to be determinded which is conveyed into a rotatable and well known steeping drum 30 by the conveyor belt 21 which moves in the direction of the arrow shown in FIG. 1 above the conveyor belt.

The steeping drum has an axis which is horizontal or slightly sloping towards the right and the drum itself is mounted in bearings 32 for rotation about said axis. The drum has an inlet opening and an outlet opening 34 and 36, respectively, as well as a toothed crown 38 for rotating the drum by means of a pinion 40 of a motor 42. The drum possesses a closed circumferential wall, and in its interior well known driver ledges 46 for the waste paper to be steeped are fixed to the drum wall. These driver ledges are slightly inclined with respect to the drum axis such that they convey the waste paper during the steeping process towards the right.

A branch pipe 52 of a water conduit 50 leads through a through-flow quantity meter 54 and a valve 56 to the charging or inlet opening 34 of the steeping drum 30. For the purpose of determining the quantity of water necessary for the adjustment of a certain substance density during the steeping procedure, a computer 60 is provided which is connected to the weighing elements 24 by a line 24a and which controls the driving device 12, the driver motor 18 and the driver motor 26 by way of lines 12a, 18a and 26a. Furthermore the substance density for the steeping process as a set value can be adjusted at the computer 60 in a well known manner, and since the computer is also connected to the throughflow quantity meter 54 and the valve 56 by lines 54a and 56a, it can ensure that together with the quantity of waste paper introduced into the steeping drum 30 by the conveyor belt 21 always also the quantity of water flows into the steeping drum 30 which is required for obtaining the pre-selected substance density.

The steeped fibre material which issues from the steeping drum 30 through the outlet opening 36 falls into a mixer 70 which comprises an upwardly open mixing container 72 with an overflow tube 74 in the upper region and an outlet tube 76 directly above the bottom 78 of the container. A preferably time-controlled discharge valve 80 well known in the art is located in this outlet tube. Furthermore the mixer possesses immediately above the bottom 78 of the container a rotor or mixer wheel 82 which is driven by a motor 84 by means of a vertical shaft.

The overflow tube 74 and the outlet tube 76 terminate above an open vibrator screen, known in the art as Jonsson screen, which is described in detail in connection with FIGS. 6 to 8 of U.S. Pat. No. 4,167,438. A vessel 92 for wanted material is located below the vibrator screen, whereas spray tubes 94 are arranged above the vibrator screen and are fed by the water conduit 50 through a pipe 96. Finally, a pipe 98 leads from the water conduit 50 into the mixer 70, and each of the pipes 96, 98 is provided with an adjustable valve 100. Finally, a dirt container 102 is located under the dirt material outlet of the vibrator screen 90.

The illustrated apparatus permits the method according to the invention to be performed quasi-continuously, the mean through-travel time of the waste paper through the steeping drum 30 amounting to preferably from twenty to thirty minutes and a substance density between fifteen and thirty percent being adjusted at the same time. When the steeped material falls through the outlet opening 36 of the steeping drum 30 into the mixer 70, so much water is added thereto through the pipe 98 that a substance density of approximately from three to five percent is obtained in the mixer. The steeped material and the diluting water are set to rapid circulation by the mixer wheel 82, and the inventor has found that the substance leaving the mixer 70 through the overflow tube 74 had already been sufficiently dissolved by the stated measures.

At intervals of time of approximately five minutes the discharge valve 80 is opened for a short period of time, in order to discharge heavy particles and coarse dirt, from which usable fibres are washed out still in the vibrator screen 90 during sorting the material fed onto the vibrator screen through the overflow tube 74.

Whereas in the foregoing the overall process was described in connection with FIG. 1, in the following some details will be described in connection with FIGS. 2 to 5.

Figure 2:
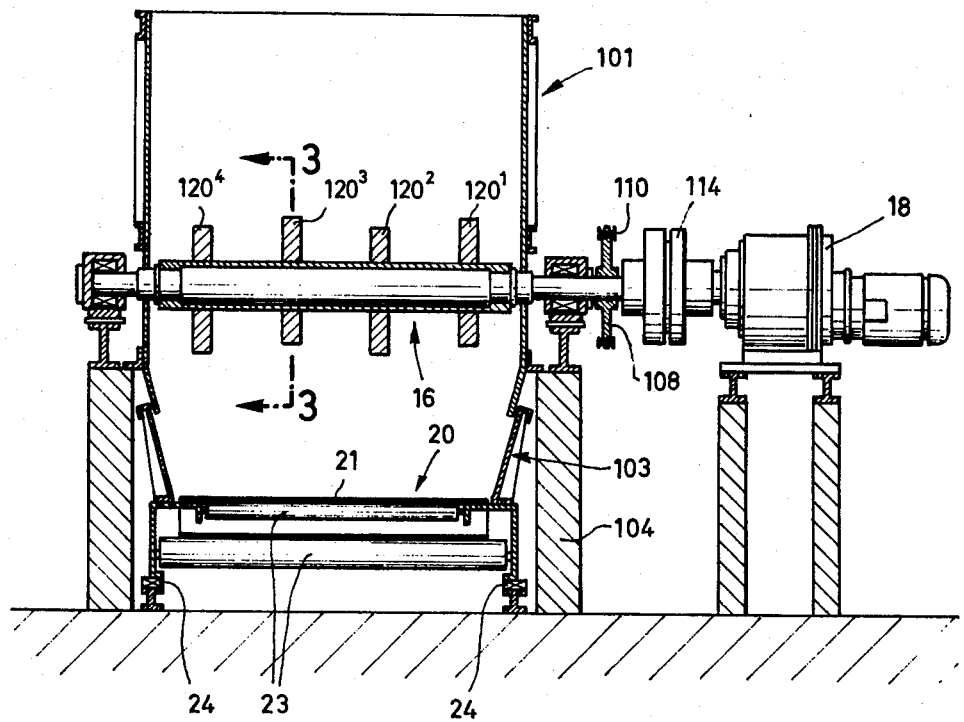
FIG. 2 shows a sectional view of the distributor device according to line 2—2 in FIG. 1.
Figure 3:
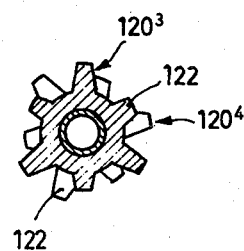
FIG. 3 shows a sectional view of one of the distributor shafts of the distributor device according to line 3—3 in FIG. 2.

FIG. 2 shows the distributor device 14 and its distributor shafts in detail. The distributor device has a duct 101 which is open at its upper end and discharges into a hopper 103 of the conveyor belt device 20. The duct 101 is supported by a base 104 whereas the conveyor belt device rests on the weighing elements 24. Several distributor shafts are arranged in the lower part of duct 101 and traverse said duct. They are provided with sprockets 108, and the sprockets of the shafts are interconnected by a drive chain 110, so that only one of the distributor shafts must be driven by the motor 18 through an elastic clutch 114. As it becomes obvious from FIGS. 2 and 3 on each of the distributor shafts several toothed discs $120^1$ through $120^4$ are mounted in staggered relationship with regard to the position of their teeth 122. By said rotating discs the waste paper which falls into the duct 101 is divided into small portions which are spread over the conveyor belt 21 supported by idle rollers 23 and the rollers 22 already mentioned. The computer 60 comprises several timing elements controlling the motors 12, 18 and 26 such that the conveyor belt 21 is driven slowly over most of the time with only short stop intervals during which the motors 12 and 18 are switched on and the weight of the waste paper on the conveyor belt 21 is measured, so that when the motors 12 and 18 are stopped again and the motor 18 is started by the computer 60 the amount of steeping water determined by the computer in dependance of the signal of the weighing elements 24 is released from the quantity meter 54 into the steeping drum 30 at a rate corresponding to the rate at which the waste paper is fed into the steeping drum. In this connection one has to observe that the diameters of the input and output openings 34 and 36, respectively, of the steeping drum 30 are of course smaller than the drum diameter.

As it is self-explanatory for the expert in the art any computer can be used which comprises timing elements and is suitable for being set to the wanted values for the substance density which provides a multiplier for a calculation to be carried through by the computer, namely to multiply the amount of waste paper on the conveyor belt with the set substance density (in percent) and with "100" in order to obtain the amount of water for steeping the weighed batch of waste paper.

By using an appropriate motor 42 and reduction gear ratio of the elements 40, 38 one can predetermine the duration of stay of the waste paper in the steeping drum 30 and, therefore, the duration of steeping—due to the fact that the driver ledges 46 have a fixed slope relative to the drum axis the distance by which each volume element of waste paper is displaced during each revolution of the steeping drum is also a fixed one, so that the duration of stay of the waste paper within the drum depends substantially only on the rotational speed of the drum.

Moreover, since the periods during which the conveyor belt 21 is stopped for measuring purposes are short compared with the periods during which the conveyor belt feeds waste paper into the steeping drum 30 the loading process of the steeping drum is quasi-continuous.

Turning now to the mixer 70 the arrow in FIG. 5 indicates the direction of rotation of the rotor 82. The latter has e.g. four rotor blads 82a in the form of rectangular vanes which are slightly offset with regard to the radii pertaining to the rotor axis such that the fibres and other elongated elements obtained from the dissolved waste paper can not cling to the rotor blades.

The substance density in the mixer 70 can be controlled either manually by means of the valve 100 shown in FIG. 1 or automatically by using instead of valve 100 a through flow quantity meter controlled also by computer 60 since the amount of water needed in the mixer 70 depends also on the output signals of weighing elements 24.

We claim:

1. Apparatus for sorting dissolvable fibrous material from non-dissolvable material in waste paper, the apparatus comprising:

an elongated cylindrical steeping drum mounted for rotation about its longitudinal axis, said axis being oriented substantially horizontally, the steeping drum having a circumferentially closed wall with an axial inlet at one end for receiving waste paper and an axial outlet at the other end from which the steeped material discharges, the interior of the steeping drum having a plurality of circumferentially spaced, substantially longitudinal ledges for lifting and dropping the waste paper as the drum rotates during the steeping;

means for feeding waste paper into the axial inlet of the steeping drum;

means for adding water to the waste paper to be steeped;

means for rotating the steeping drum about its longitudinal axis, the rate of waste paper feed into the drum, the specific orientation of the longitudinal axis of the steeping drum, the rate of addition of water to the waste paper, the specific orientation of the ledges within the drum, the configuration of the outlet and the speed of rotation being coordinated to yield a steeping time of between 10 and 120 minutes at a substance density of between 10% and 40%;

a mixing chamber for receiving the steeped material after it is discharged from the outlet of the steeping drum;

means for adding diluting water to the steeped material in the mixing chamber, the mixing chamber comprising a rotor for rapidly mixing and circulating the steeped material and diluting water in order to obtain a fibrous suspension, the rate of addition of diluting water to the steeped material in the mixing chamber being coordinated with the rate of steeped material feed into the mixing chamber to achieve a substance density of between 2% and 6%; and pressureless screening means for sorting the fibrous suspension from the non-dissolvable material, the screening means being located at a level lower than the mixing chamber whereby the material may be transferred by gravity alone from the mixing chamber to the screening means.

2. Apparatus according to claim 1, the axis of the steeping drum sloping downwardly from the inlet end to the outlet end.

3. Apparatus according to claim 1, the ledges having a helical component to effect the movement of the material within the steeping drum from the inlet toward the outlet as the drum rotates about its axis.

4. Apparatus according to claim 1, wherein the rotor (82) is arranged directly adjacent the bottom (78) of the mixing chamber.

5. Apparatus according to claim 1, the means for feeding waste paper into the axial inlet of the steeping drum comprising a conveyor (20), a weighing means (24) associated with the conveyor for the purpose of weighing the quantity of waste paper spread over the conveyor and to be introduced into the steeping drum (30), and a computer (60) connected to the weighing device (24) for calculating the quantity of steeping water to be introduced into the steeping drum (30) in dependance of the quantity of waste paper on the conveyor and a predetermined ratio of waste paper to water, the means for adding water to the waste paper to be steeped being controlled by the computer.

6. Apparatus according to claim 5 further comprising means for dividing and distributing the waste paper onto the feeder conveyor.

7. Apparatus according to claim 1, the mixing chamber (72) comprising an overflow (74) for a continuous discharge of the fibre suspension.

8. Apparatus according to claim 1, the mixing chamber (72) comprising at the bottom an outlet opening (76) with a valve (80) for selectively discharging heavy particles and coarse dirt.

9. Apparatus according to claim 1 further comprising a vibratory screen (90) for of sorting the fibrous suspension from the non-dissolvable material.

* * * * *

UNITED STATES PATENT AND TRADEMARK OFFICE
CERTIFICATE OF CORRECTION

PATENT NO. : 4,465,591
DATED : August 14, 1984
INVENTOR(S) : Emil Holz, Hagen Hutzler It is certified that error appears in the above-identified patent and that said Letters Patent is hereby corrected as shown below:

Claim 1, line 1 of column 6, after "the" (first occurrence) insert -- longitudinal axis of the steeping drum, the rate of addition of water to the waste paper, the specific orientation of the --.

Signed and Sealed this

Sixteenth Day of April 1985

[SEAL]

Attest:

DONALD J. QUIGG

Attesting Officer

Acting Commissioner of Patents and Trademarks